(12) United States Patent
Piao

(10) Patent No.: US 12,360,709 B2
(45) Date of Patent: Jul. 15, 2025

(54) DISTRIBUTED STORAGE SPACE MANAGEMENT METHOD, COMPUTING DEVICE AND STORAGE MEDIUM

(71) Applicant: HANGZHOU ALICLOUD FEITIAN INFORMATION TECHNOLOGY CO., LTD., Hangzhou (CN)

(72) Inventor: Jun Piao, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/684,941

(22) PCT Filed: Jan. 11, 2023

(86) PCT No.: PCT/CN2023/071809
§ 371 (c)(1),
(2) Date: Feb. 20, 2024

(87) PCT Pub. No.: WO2023/138460
PCT Pub. Date: Jul. 27, 2023

(65) Prior Publication Data
US 2024/0361959 A1  Oct. 31, 2024

(30) Foreign Application Priority Data

Jan. 20, 2022  (CN) .......................... 202210068450.9

(51) Int. Cl.
*G06F 3/06* (2006.01)
(52) U.S. Cl.
CPC ............ *G06F 3/067* (2013.01); *G06F 3/0604* (2013.01); *G06F 3/0644* (2013.01); *G06F 3/0655* (2013.01)

(58) Field of Classification Search
CPC ...... G06F 3/067; G06F 3/0604; G06F 3/0644; G06F 3/0655
See application file for complete search history.

(56) References Cited

U.S. PATENT DOCUMENTS 10,531,592 B1 * 1/2020 Jau .................... G06F 3/0629
2015/0317091 A1  11/2015 Hussain et al.
(Continued)

FOREIGN PATENT DOCUMENTS

| CN | 109496296 A | 3/2019 |
|---|---|---|
| CN | 109582592 A | 4/2019 |

(Continued)

OTHER PUBLICATIONS

International Search Report for PCT/CN2023/071809 entitled "Distributed Storage Space Management Method, Computing Device and Storage Medium", dated Apr. 21, 2023 (5 pages including English-language translation).

(Continued)

*Primary Examiner* — Ryan Bertram
(74) *Attorney, Agent, or Firm* — Clark Hill PLC

(57) ABSTRACT

A distributed storage space management method, a computing device and a storage medium are provided. An embodiment is applied to a hardware smart card, which is deployed on a local host as a local hardware smart card. A corresponding storage space is partitioned for a local virtual device from a pre-configured storage device; the partitioned storage space is simulated to generate a simulated storage device corresponding to the local virtual device, for use by the local virtual device. A storage space application request of a remote hardware smart card is received, and according to the request, a corresponding storage space is partitioned for a remote virtual device from the pre-configured storage device, so that the partitioned storage space is simulated by means of the remote hardware smart card to generate a (Continued)

simulated storage device corresponding to the remote virtual device, for use by the remote virtual device.

20 Claims, 3 Drawing Sheets

(56) References Cited

U.S. PATENT DOCUMENTS

| | | | |
|---|---|---|---|
| 2017/0075856 A1* | 3/2017 | Suzue | H04L 67/1001 |
| 2018/0032249 A1* | 2/2018 | Makhervaks | G06F 3/061 |
| 2019/0146675 A1* | 5/2019 | Subramanian | G06F 3/06 |
| | | | 711/170 |
| 2021/0081312 A1* | 3/2021 | Coury | H04L 67/1095 |
| 2021/0240353 A1* | 8/2021 | Guan | G06F 3/0662 |
| 2022/0100544 A1* | 3/2022 | Voltz | G06F 9/45541 |
| 2022/0206962 A1* | 6/2022 | Kim | G06F 13/102 |
| 2023/0305977 A1* | 9/2023 | Glimcher | H04L 67/08 |

FOREIGN PATENT DOCUMENTS

| | | |
|---|---|---|
| CN | 111722786 A | 9/2020 |
| CN | 114089926 A | 2/2022 |

OTHER PUBLICATIONS

Written Opinion for PCT/CN2023/071809 entitled "Distributed Storage Space Management Method, Computing Device and Storage Medium", dated Apr. 21, 2023 (5 pages).

* cited by examiner

DISTRIBUTED STORAGE SPACE
MANAGEMENT METHOD, COMPUTING
DEVICE AND STORAGE MEDIUM

This is an application under 35 U.S.C. § 371 of International Application No. PCT/CN2023/071809, entitled "DISTRIBUTED STORAGE SPACE MANAGEMENT METHOD, COMPUTING DEVICE AND STORAGE MEDIUM", which claims priority to Chinese patent application No. 202210068450.9, filed on Jan. 20, 2022 with the China Patent Office and entitled "DISTRIBUTED STORAGE SPACE MANAGEMENT METHOD, COMPUTING DEVICE AND STORAGE MEDIUM", which is incorporated herein by reference in its entirety.

TECHNICAL FIELD

The present application relates to the field of computer technology, and especially to a distributed storage space management method, a computing device and a storage medium.

BACKGROUND

A local disk is a local hard drive device on a physical machine where an elastic compute service (ECS) instance is located. The local disk can provide local storage access capabilities to the ECS instance, having advantages such as low latency, high random input/output operations per second (IOPS), high throughput, and high cost performance.

However, the local disk is limited by local disk device resources of the physical host in terms of storage space, not allowing for elastic expansion, and there is a problem of low space utilization. Moreover, in the event of a local disk failure, rapid recovery cannot be achieved.

SUMMARY

Multiple aspects of the present application provide a distributed storage space management method, a computing device and a storage medium, so that the problem that a local storage device of a host cannot be laterally expanded is effectively solved, and the shortage of virtual device storage space is reduced, while rapid recovery of the storage device may be achieved.

An embodiment of the present application provides a distributed storage space management method, applied to a hardware smart card, wherein the hardware smart card is deployed on a local host as a local hardware smart card, and the local host is deployed with a local virtual device, the method comprises: partitioning a corresponding storage space for the local virtual device from a pre-configured storage device; simulating the partitioned storage space to generate a simulated storage device corresponding to the local virtual device, for use by the local virtual device; and receiving a storage space application request of a remote hardware smart card, and partitioning, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device.

An embodiment of the present application further provides a computing device, comprising: a memory and a processor, wherein the memory is used for storing a computer program; and the processor executes the computer program to: partition a corresponding storage space for a local virtual device from a pre-configured storage device; simulate the partitioned storage space to generate a simulated storage device corresponding to the local virtual device, for use by the local virtual device; and receive a storage space application request of a remote hardware smart card, and according to the storage space application request, partition a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

An embodiment of the present application further provides a computer-readable storage medium storing a computer program that, when executed by one or more processors, causes the one or more processors to implement the steps in the method described above.

An embodiment of the present application further provides a computer program product, comprising a computer program or instructions, wherein the computer program, when executed by a processor, causes the processor to implement the steps in the method described above.

In the embodiments of the present application, the embodiments of the present application are applied to a hardware smart card, the hardware smart card being deployed on a local host as a local hardware smart card, and the local host being deployed with a local virtual device. A corresponding storage space is partitioned for the local virtual device from a pre-configured storage device; the partitioned storage space is simulated to generate a simulated storage device corresponding to the local virtual device, for use by the local virtual device. A storage space application request of a remote hardware smart card is received, and according to the storage space application request, a corresponding storage space is partitioned for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

A corresponding storage space is partitioned for a local virtual device from a pre-configured storage device; and the partitioned storage space is simulated to generate a simulated storage device corresponding to the local virtual device, for use by the local virtual device, so that the demand of the local virtual device for a storage device is met by flexibly partitioning the storage space and generating the simulated storage device.

A storage space application request of a remote hardware smart card is received, and according to the storage space application request, a corresponding storage space is partitioned for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device. Accordingly, the demand of the remote virtual device for a storage device is met by flexibly partitioning the storage space, and generating the simulated storage device by means of the remote hardware smart card.

Therefore, local and remote storage spaces are managed, the problem of a local storage device not being able to be laterally expanded is effectively solved, and the shortage of virtual device storage space is reduced. Meanwhile, the utilization of storage resources is improved, and the waste of storage space is decreased. Meanwhile, once a failure occurs in a pre-configured storage device, namely a local storage device, the storage device may be rapidly switched to a remote storage device according to the embodiments of the present application, thereby achieving rapid recovery of the storage device.

BRIEF DESCRIPTION OF THE DRAWINGS

The drawings described here are used to provide a further understanding of the present application, and constitute a part of the present application. The illustrative embodiments of the present application and descriptions thereof are used to explain the present application, and do not constitute an improper limitation of the present application. In the drawings.

DETAILED DESCRIPTION

In order to enable the purposes, technical solutions and advantages of the present application more explicit, the technical solutions of the present application will be described clearly and completely below with reference to specific embodiments and the corresponding drawings of the present application. Obviously, the described embodiments are only some of the embodiments of the present application, rather than all embodiments. Based on the embodiments of the present application, all other embodiments obtained by those of ordinary skill in the art without any creative labor should fall within the scope of protection of the present application.

As can be known from the above, advantages of a local disk lie in low latency, high random IOPS, high throughput and other performances, as well as low costs and high cost performance. The local disk also has disadvantages. Its storage space is limited by local disk device resources of the physical host, not allowing for elastic expansion, and there is a problem of low space utilization. Moreover, in the event of a local disk failure, rapid recovery cannot be achieved.

With regard to the above problems, an embodiment of the present application provides a distributed storage space management method, a computing device and a storage medium, thereby effectively solving the problem of a local storage device not being able to be laterally expanded, and reducing the shortage of virtual device storage space. Meanwhile, rapid recovery of the storage device may be achieved.

A distributed storage space management process will be described in detail below with reference to a method embodiment.

Figure 1:
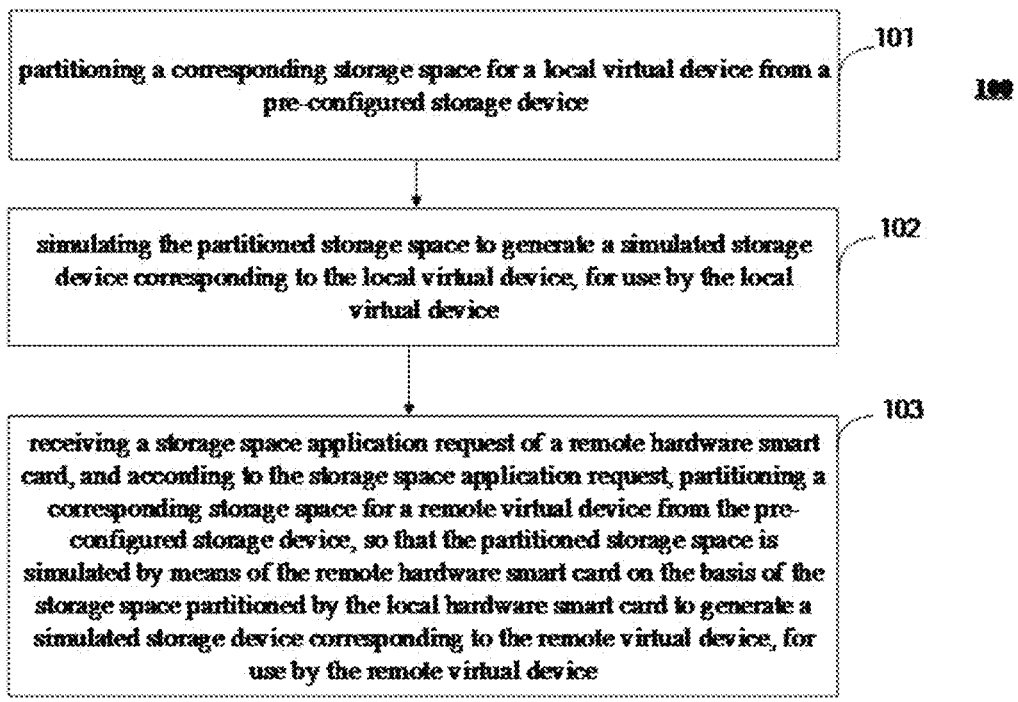
FIG. 1 is a flow chart of a distributed storage space management method in an exemplary embodiment of the present application.

FIG. 1 is a flow chart of a distributed storage space management method in an exemplary embodiment of the present application. This method 100 provided in the embodiment of the present application is executed by a computing device, such as a hardware smart card or the like. The hardware smart card is deployed on a local host as a local hardware smart card, and the local host is deployed with a local virtual device. This method 100 comprises the following steps:

101: partitioning a corresponding storage space for the local virtual device from a pre-configured storage device.

102: simulating the partitioned storage space to generate a simulated storage device corresponding to the local virtual device, for use by the local virtual device.

103: receiving a storage space application request of a remote hardware smart card, and partitioning, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

It should be explained that the hardware smart card is a smart card having a corresponding logical component and hardware component. The hardware smart card not only may be deployed on a local host (e.g., a server) as a local hardware smart card, but also may be deployed on a corresponding remote host as a remote hardware smart card. The remote host and the local host may constitute a corresponding host cluster. That is, this host cluster may also correspond to a hardware smart card cluster having the local hardware smart card and the remote hardware smart card. The hardware smart card may be deployed onto a host by means of a slot of a peripheral component interconnect express (PCIe) bus, which, as one important branch of a computer bus, follows existing PCI programming concepts and signal standards, and builds a higher-speed serial communication system standard. Moreover, it communicates with the corresponding host through the PCIe bus. The hardware smart card may be a hardware offload card, a smart network card, a hardware accelerator card, a smart memory card, or the like.

The local virtual device may be a virtual machine, on which a corresponding Application APP is deployed.

Figure 2:
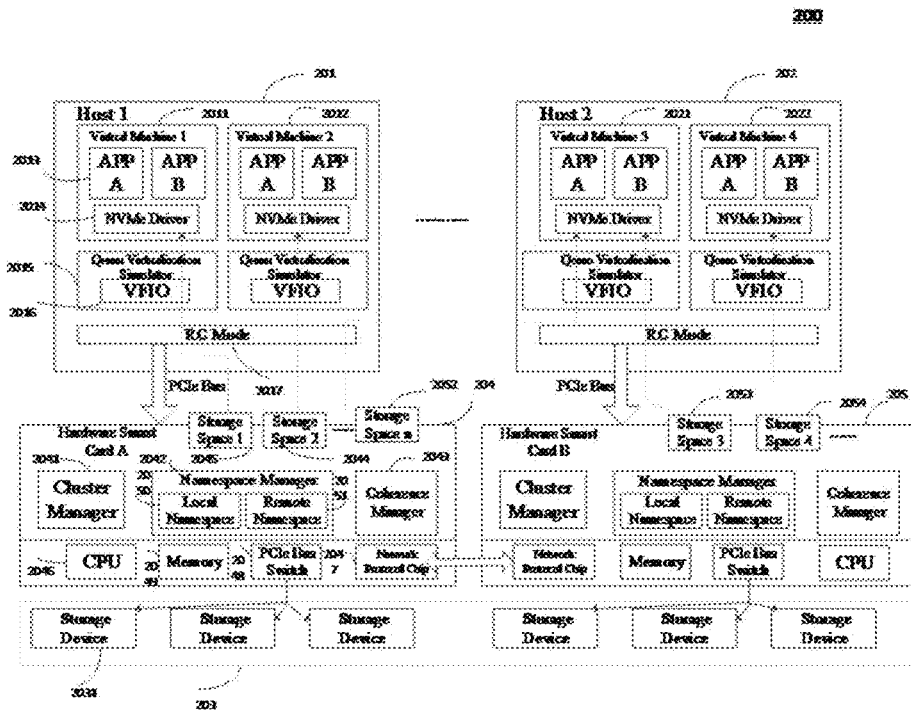
FIG. 2 is a schematic diagram of a distributed storage space management process in an exemplary embodiment of the present application.

As shown in FIG. 2, a management process 200 is illustrated, in which a local hardware smart card, namely hardware smart card A204, is deployed onto a local "Host 1" 201 by means of a slot of a PCIe bus. "Virtual Machine 1" 2011 and "Virtual Machine 2" 2012 are deployed on "Host 1" 201. "Application APP A" 2013 or the like may be deployed on "Virtual Machine 1" 2011. The same application, or a different application may also be deployed on "Virtual Machine 2" 2012.

The above steps will be expounded in detail below.

101: partitioning a corresponding storage space for the local virtual device from a pre-configured storage device.

The pre-configured storage device refers to a solid state disk or solid state drive SSD, and specifically may be a non-volatile memory express (NVMe) SSD.

The storage space refers to a storage space partitioned for a basic storage unit of the pre-configured storage device. The basic storage unit may be a pre-configured storage unit space, namely namespace, and each virtual device may be partitioned to one namespace at the beginning. For example, one pre-configured storage device has 10 namespaces, and one namespace may be partitioned for each virtual device.

For example, as described above, after the local hardware smart card is started, the corresponding storage space, such as one namespace, may be partitioned for one virtual machine on the local host from a local SSD.

As shown in FIG. 2, the local hardware smart card, namely hardware smart card A204, partitions one namespace for "Virtual Machine 1" 2011.

In order to be able to better implement corresponding functions through the hardware smart card, the above partition may be implemented by deploying a logical component.

Specifically, the hardware smart card is deployed with a namespace manager; this method 100 further comprises: the partitioning a corresponding storage space for the local virtual device from a pre-configured storage device comprises: partitioning, by means of the namespace manager, the corresponding storage space for the local virtual device from the pre-configured storage device.

For example, as described above, the hardware smart card is deployed with a logical component, namely a namespace manager, which is responsible for managing space of local and remote pre-configured storage device SSDs, and applying for or releasing disk space at the granularity of namespace.

Therefore, by means of this namespace manager, the corresponding storage space, such as one namespace, is partitioned for the local virtual machine from the local pre-configured SSD.

As shown in FIG. 2, the local hardware smart card of "Host 1" 201, namely hardware smart card A204, partitions one namespace from the local SSD (i.e., a local storage device 2031) by means of namespace manager 2042 to "Virtual Machine 1" 2011.

102: simulating the partitioned storage space to generate a simulated storage device corresponding to the local virtual device, for use by the local virtual device.

For example, as described above, as shown in FIG. 2, after one namespace is partitioned to "Virtual Machine 1" 2011, it is simulated into a simulated SSD device by means of hardware to directly pass-through to "Virtual Machine 1" 2011 for use, thereby completing that "Host 1" 201 creates the simulated SSD device for "Virtual Machine 1" 2011.

Specifically, the simulating the partitioned storage space to generate a simulated storage device corresponding to the local virtual device comprises: by means of the local hardware smart card, simulating the partitioned storage space to generate a simulated storage device meeting a pre-configured interface protocol, and providing the corresponding simulated storage device to the local virtual device by means of a bus of the local host.

The pre-configured interface protocol refers to an interface protocol or interface specification supported by the pre-configured storage device, such as non-volatile memory express (a non-volatile memory host controller interface specification) supported by the SSD, namely NVMe SSD.

It should be explained that the serial advanced technology attachment (SATA) protocol, namely serial ATA, a new specification for hard disk interfaces, may also be available. Because of a serial connection way, hard drives using a SATA interface are also called serial hard drives. For a SATA SSD, the namespace manager of the hardware smart card is required to implement a space management capability similar to the storage space division for this SATA SSD.

For example, as described above, the hardware smart card takes over all local NVMe SSD devices by means of an NVMe driver. A Hypervisor virtual machine monitor (VMM) deployed on the hardware smart card partitions a plurality of namespaces on the NVMe SSD by means of the NVMe driver. The Hypervisor virtual machine monitor simulates a namespace into an NVMe device, which, specifically, includes a vhost-nvme backend and a nvme frontend, namely frontend and backend components of the virtual NVMeSSD device; wherein, the namespace serves as the vhost-nvme backend to provide actual physical storage space and read-write capabilities. Meanwhile, the NVMe implements the nvme frontend, i.e. virtual function (VF) PCIe device, which is directly pass-through to the virtual machine. In this way, a conversion is achieved from the namespace to a virtual NVMe hard disk.

The driver is a driver that meets the NVMe protocol, which utilizes this protocol to perform communication, such as a NVMe driver.

Accordingly, the local hardware smart card may create a corresponding simulated NVMe SSD device for the corresponding virtual machine. As shown in FIG. 2, the local hardware smart card, namely hardware smart card A204, may partition corresponding "Storage Space 1" 2045 and "Storage Space 2" 2044 for "Virtual Machine 1" 2011 and "Virtual Machine 2" 2012 according to the above way. Accordingly, a corresponding simulated SSD is generated. This will not be repeated here.

After the simulated SSD is created, the local virtual device may perform data reading and writing. A specific way is as follows.

Specifically, the hardware smart card comprises a bus switch; by means of the bus switch, at least one pre-configured storage device is deployed onto the local hardware smart card and thus onto the local host. This method 100 further comprises: delivering, by means of a bus switch, the encapsulated read and write data to the pre-configured storage device, to achieve data reading and writing in the corresponding storage space.

The bus switch (PCIe switch or PCIe bus switch), which is a hardware component belonging to the hardware smart card. It may be responsible for connecting a plurality of local SSDs, such as NVMe SSD devices, for the local host and the local hardware smart card.

For example, as described above, the plurality of NVMe SSD devices may be deployed for the local host by means of this PCIe switch. Moreover, the read and write data is delivered by means of the PCIe protocol supported by the PCIe switch to achieve data reading and writing in a corresponding namespace in the simulated SSD.

Specifically, this method 100 may further comprise: receiving, according to a direct memory access mode, read and write data sent through a corresponding driver by the local virtual device, the driver meeting the pre-configured interface protocol and encapsulating the corresponding read and write data by means of the pre-configured interface protocol to send the read and write data; and delivering, by means of a bus switch, the read and write data encapsulated according to the pre-configured interface protocol to the pre-configured storage device, to achieve data reading and writing in the corresponding storage space.

The driver is a driver that meets the NVMe protocol, which utilizes this protocol to perform communication, such as a NVMe driver.

The direct memory access mode refers to a DMA access way, which is a memory access way. It allows some hardware subsystems (computing device peripherals) inside a computing device to directly read and write system memory independently without the need for a central processing unit (CPU) to intervene in processing. Under the same level of processor burden, the DMA is a rapid data transfer way.

For example, as described above, as shown in FIG. 2, "Application APP A" 2013 deployed inside "Virtual Machine 1" 2011 delivers read and write IO through NVMe driver 2014, which carries read and write data. NVMe driver 2014 encapsulates the read and write data into a DMA request that meets the NVMe protocol, and accesses a bar register space of the PCIe device of the NVMe SSD, so as to enable to notify the local simulated NVMe SSD to perform data migration upon the DMA request, that is, to notify the local hardware smart card to perform data migration. Accordingly, the local hardware smart card acquires the read and write data of the NVMe protocol. Then it is delivered to the local NVMe SSD corresponding to the local simulated SSD through the PCIe switch, namely PCIe bus switch 2048. For example, it is written to a flash storage medium of the SSD, the write IO request is completed.

It should be explained that during the data delivery process, as shown in FIG. 2, virtual function input output 2016 (VFIO, or virtual IO, which is a frame that may safely expose device I/O, interrupt, DMA, or the like to userspace, so that device drive may be completed in the userspace, and with the direct device access to the userspace, the virtual machine may obtain higher IO performance) is utilized to directly pass-through the local simulated NVMe SSD to the inside of the virtual machine, for use as a local block device. VFIO 2016 is deployed inside Qemu virtualization simulator 2015.

In addition, when the PCIe bus is utilized for communication, it is possible to utilize its RC mode 2017 (PCIExpress root complex, or root complex, which is a PCIe root controller) as shown in FIG. 2 for communication.

It should be explained that for SSDs that support other protocols, such as an SATA SSD, its corresponding driver may also be a driver that supports SATA, or a protocol converter is used to convert the NVMe protocol into the SATA protocol, and then delivery of the read and write data is performed in the way of DMA.

Since each physical NVMe SSD usually corresponds to one virtual machine, its storage space cannot be partitioned, so it cannot be used or partitioned flexibly. However, by means of the embodiments of the present application, physical NVMe SSDs may be partitioned flexibly.

In order to be able to better manage local storage space, it is possible to continue to logically partition a namespace manager to support local and remote storage space management.

Specifically, the namespace manager comprises a local namespace for recording a usage state of the pre-configured storage device corresponding to the local hardware smart card, and a remote namespace for recording a usage state of the pre-configured storage device corresponding to the remote hardware smart card.

As shown in FIG. 2, local namespace 2050 (Local NS) builds a namespace storage pool based on the local NVMe SSD. The remote namespace 2051 (Remote NS) manages a remote namespace storage pool. They may record usage states or partition states of corresponding namespaces respectively. For example, how many namespaces are partitioned to a local virtual machine by a corresponding local SSD, and how many namespaces are partitioned to a remote virtual machine. They may also record information of a corresponding virtual machine, such as ID, remote hardware smart card information, or the like, so that corresponding storage space may be provided later for the local virtual machine or remote virtual machine.

103: receiving a storage space application request of a remote hardware smart card, and partitioning, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

The remote hardware smart card, as can be known from the above, may refer to a remote hardware smart card deployed on a remote host in this cluster.

For example, as described above, as shown in FIG. 2, when "Host 2" 202 serves as a remote host, its local hardware smart card, namely hardware smart card B205, serves as the remote hardware smart card and creates a corresponding NVMe SSD for "Virtual Machine 3" 2021 deployed on "Host 2" 202. According to the way described above, its namespace manager 2042 may find a space shortage of the local NVMe SSD space from information recorded in local namespace 2050 deployed by the above hardware smart card B205. For example, when one complete namespace is created for use according to a local storage space creation request, but the space of the local NVMe SSD of hardware smart card B205 is insufficient, and thus one corresponding namespace cannot be created according to this request. Then, it is possible to search available storage space of other remote hardware smart cards from remote namespace 2051, namely Remote NS, of the above hardware smart card B205. For example, as a remote hardware smart card of hardware smart card B205: hardware smart card A204 of "Host 1" 201, if it is found that hardware smart card A204 of "Host 1" 201 has excess storage space, a space application request may be initiated to hardware smart card A204 of "Host 1" 201. When hardware smart card A204 of "Host 1" 201 receives this request, it then may partition a corresponding namespace, such as storage space n2052, from its local SSD according to the storage space requested in this request, that is, a Local NS storage space to which the corresponding namespace belongs is converted into a Remote NS storage space. Then, a partition result may be returned to namespace manager 2042 of hardware smart card B205 of "Host 2" 202, which is, for example, the number of namespaces as partitioned, and information of a corresponding namespace, such as ID or other information. Accordingly, namespace manager 2042 may create a corresponding Remote NS space based on this partition result, record this space information, and simulate the same into an NVMe SSD through hardware smart card B205 to directly pass-through to "Virtual Machine 3" 2021 for use, which will not be repeated. The specific simulation process has been expounded above, which will not be repeated. In addition, "Host 2" 202 also has other virtual machines, such as "Virtual Machine 4" 2022.

Similarly, a local hardware smart card may submit a space application to other remote hardware smart cards in this cluster in a case where a shortage of the local storage space is found when partitioning a corresponding storage space for a virtual device deployed on the local host.

Specifically, this method 100 further comprises: when a storage space in the pre-configured storage device corresponding to the local hardware smart card is less than a threshold, determining, by means of the remote namespace, a remote hardware smart card that can meet a current storage space demand, and sending a storage space application request to a corresponding remote hardware smart card, to partition a corresponding storage space for the local virtual device from a pre-configured storage device corresponding to the remote hardware smart card.

It should be explained that the specific implementation is similar to the above and will not be repeated. The only explanation is made for "when a storage space in the pre-configured storage device corresponding to the local hardware smart card is less than a threshold", and the threshold therein may refer to a needed amount of storage space. For example, the current storage space in the pre-configured storage device is less than an amount of storage space that needs to be provided for the virtual machine, or the like.

This is also similar for a remote hardware smart card. This method 100 further comprises: when a storage space in the pre-configured storage device corresponding to the remote hardware smart card is less than a threshold, determining, by means of the remote namespace, another remote storage device that can meet a current storage space demand, and sending a storage space application request to the other remote hardware smart card, to partition a corresponding storage space for the corresponding remote virtual device from a pre-configured storage device corresponding to the other remote hardware smart card.

This will not be repeated here.

As can be known from the above, the partitioning a corresponding storage space for a remote virtual device from the pre-configured storage device comprises: partitioning, by means of the namespace manager, the corresponding storage space for the remote virtual device from the pre-configured storage device.

By means of this namespace manager, the corresponding storage space, such as one namespace, is partitioned for the remote virtual machine from the local pre-configured SSD.

When applying for storage space, one hardware smart card may receive a plurality of requests and thus coordination is needed. Or, after partitioning the corresponding storage space for a certain request, in order to prevent this storage space from being used again by another virtual device, it needs to perform coordination.

Accordingly, remote NVMe SSDs may be managed to form a globally unified namespace resource pool. As shown in FIG. 2, a storage resource pool 203 composed of storage devices 2031 corresponding to this cluster may be managed. NVMe storage resources are provided for the local virtual device, effectively solving the problem of a host local disk not being able to be laterally expanded, and avoiding the shortage of virtual machine storage space.

Specifically, the hardware smart card is deployed with a coherence manager; wherein this method 100 further comprises: locking, by means of the coherence manager, the corresponding storage space for the local virtual device according to the storage space application request, so that other hardware smart cards cannot occupy the corresponding storage space.

The coherence manager is responsible for maintaining the global coherence of the namespaces and providing namespace-level mutual exclusion capabilities for the namespace manager, such as preventing the partitioned storage space from being used by other hardware smart cards, or regulating concurrent requests.

For example, as described above, when the local hardware smart card or the remote hardware smart card sends a space request, as shown in FIG. 2, a quota of partitioned storage space may be locked by means of coherence manager 2043 deployed thereon, such as locking the same by means of an exclusive lock to prevent other requests from partitioning this quota.

In addition, when the local hardware smart card or the remote hardware smart card is processing a space request, if a plurality of concurrent requests are received, one request may be randomly selected to respond, or selected according to priority rules.

In addition to the above, health information of each hardware smart card in this cluster may also be supervised and detected, so as to better and faster select a corresponding hardware smart card for request application.

Specifically, the hardware smart card deploys a cluster manager for managing hardware smart cards in a corresponding cluster; and this method 100 further comprises: acquiring, by means of the cluster manager, health states of remote hardware smart cards in the corresponding cluster; when acquiring, by means of the cluster manager, a remote hardware smart card with the health state being abnormal in the corresponding cluster, removing the abnormal remote hardware smart card; acquiring and recording, by means of the cluster manager, a newly added remote hardware smart card in the corresponding cluster and a corresponding health state; and acquiring, by means of the cluster manager, usage states of pre-configured storage devices corresponding to the remote hardware smart cards, so that remote namespaces record the usage states.

The cluster manager, which may also be referred to as a cluster management apparatus, is used by each hardware smart card for maintaining global hardware smart card state information in the cluster, such as health information, so as to apply for space from remote hardware smart cards. Meanwhile, it is responsible for detecting a health state of each hardware smart card, detecting newly added hardware smart card members and removing failed hardware smart card members in real time.

The health state refers to whether a running state of a remote hardware smart card is normal. It is possible to indicate the health state by sending a heartbeat packet, such as sending information or an instruction indicative of health.

For example, as described above, as shown in FIG. 2, cluster manager 2041 of the local hardware smart card, namely hardware smart card A204, may regularly send a heartbeat packet to cluster managers 2041 of other hardware smart cards in this cluster to indicate its own normal state, namely healthy state. Meanwhile, hardware smart card A204 may also receive heartbeat packets sent by other hardware smart cards in this cluster, thereby recording the health state of each hardware smart card in the cluster by means of cluster manager 2041. If no heartbeat packet is received, it may be determined that a failure exists in the corresponding hardware smart card in the cluster, and this hardware smart card may be removed from the record information until this heartbeat packet is received again.

In addition, a hardware smart card newly added in the cluster, after startup, may send a heartbeat packet to other hardware smart cards according to the above way, so that the local hardware smart card may receive and record a health state of the newly added hardware smart card. Additionally, for the newly added hardware smart card, in order to send the heartbeat packet and synchronize information more quickly after startup, it may first synchronize cluster information from other online hardware smart cards. For example, health states of other hardware smart cards in the cluster may be acquired by means of the cluster manager from a management component deployed on a certain hardware smart card in this cluster.

As can be known from the above, when recording the usage state, the usage state of the pre-configured storage device corresponding to the remote hardware smart card may be acquired by means of the cluster manager, so that the remote namespace records the same, such as sending the usage state by the cluster manager. This will not be repeated.

After the corresponding remote storage space is partitioned to the local hardware smart card or the remote hardware smart card, its delivery of read and write data may be implemented in the following way.

Specifically, the hardware smart card comprises a network protocol chip, and this method 100 further comprises: receiving, by means of the local hardware smart card, read and write data sent by a network protocol chip of the remote hardware smart card, wherein the read and write data is encapsulated based on a network protocol corresponding to the network protocol chip; and acquiring, by means of a network protocol chip of the local hardware smart card, read and write data from the encapsulated read and write data, so that the local hardware smart card performs data reading and writing in the corresponding storage space based on the read and write data.

The network protocol chip is one of hardware components of the hardware smart card. This chip may support an NVMe Over Fabric protocol (which is a specification issued by an NVM Express working group to connect a host (e.g., a server) to storage through a network). It may be responsible for providing the capability of remotely accessing the NVMe SSD device, which is used to encapsulate the NVMe protocol into this network protocol to perform data communication with the remote hardware smart card.

For example, as described above, as shown in FIG. 2, "Application APP A" 2013 in "Virtual Machine 3" 2021 delivers the read and write data carried in the read and write IO to NVMe driver 2014 deployed on its "Host 2" 202. Moreover, according to the way described above, NVMe driver 2014 implements DMA transmission of IO read and write data to hardware smart card B205 by means of the PCIe device, and hardware smart card B205, by means of its network protocol chip 2047, such as an NVMe Over Fabric chip, encapsulates the read and write data into an NVMe Over Fabric network protocol and send the same to hardware smart card A204 of "Host 1" 201. Hardware smart card A204 of "Host 1" 201 parses the NVMe Over Fabric network protocol by means of its network protocol chip 2047, such as the NVMe Over Fabric chip, so as to acquire the read and write data, and delivers the same to the local NVMe SSD corresponding to the local simulated SSD by means of PCIe bus switch 2048. For example, the data is written into the flash storage medium of this SSD, the write IO request is completed.

It should be explained that since the NVMe Over Fabric network protocol corresponds to the NVMe interface protocol, for other interface protocols, it is also possible to select a corresponding network protocol, or perform protocol conversion for other interface protocols according to the above way, so as to convert them into the NVMe interface protocol.

As can be seen from the above, during the delivery process, the read and write data will first be encapsulated into a corresponding NVMe protocol, namely the NVMe interface protocol. Therefore, when the NVMe Over Fabric network protocol is encapsulated, the encapsulation is performed for the NVMe protocol.

Specifically, the pre-configured storage device is a storage device that meets a pre-configured interface protocol, a network protocol corresponding to the network protocol chip corresponds to the pre-configured interface protocol, and the read and write data is encapsulated based on the network protocol and the pre-configured interface protocol. This method 100 further comprises: receiving, by means of the local hardware smart card, the read and write data that is sent by the network protocol chip of the remote hardware smart card and is encapsulated based on the pre-configured interface protocol and the network protocol; and by means of the network protocol chip of the local hardware smart card, acquiring, from the encapsulated read and write data, read and write data encapsulated based on the pre-configured interface protocol, to perform data reading and writing in the storage space corresponding to the pre-configured storage device according to the read and write data encapsulated based on the pre-configured interface protocol.

Since the specific process has been expounded above, it will not be repeated here. Only explanation is made below. As described above, by means of the NVMe Over Fabric chip, the NVMe protocol containing read and write data is encapsulated into the NVMe Over Fabric network protocol and sent to the local hardware smart card of the local host. The local hardware smart card of the local host parses the NVMe Over Fabric network protocol into the NVMe protocol by means of the NVMe Over Fabric chip, and then sends the same to a corresponding storage space, which will not be repeated.

In addition, with regard to the NVMe Over Fabric network protocol, after the hardware smart card receives a space request and then partitions a corresponding namespace, the partitioned storage space obtained by this partition may form an NVMe Over Fabric target. Moreover, the hardware smart card that applies for space creates a Remote NS based on the partitioned space, forming an NVMe Over Fabric initiator, thereby performing network protocol communication.

According to the way described above, as shown in FIG. 2, "Host 2" 202 may partition a corresponding "Storage Space 3" 2053 for "Virtual Machine 3" 2021 from the local NVMe SSD, and partition a corresponding "Storage Space 4" 2054 for "Virtual Machine 4" 2022 from the local NVMe SSD. The specific way of reading and writing data has been expounded above, which will not be repeated. In addition, with regard to the read data, the data as read may be reversely returned to a virtual machine of a corresponding host according to the way described above, which will not be repeated.

After applying for space, it is also possible to release the applied storage space, so as to elastically expand and contract resources to improve elasticity.

Specifically, this method 100 further comprises: receiving a storage space release request of the remote hardware smart card, and releasing, according to the storage space release request, the corresponding storage space partitioned for the remote virtual device from the pre-configured storage device, so that the corresponding simulated storage device is destroyed by means of the remote hardware smart card.

For example, as described above, in a case that the virtual machine of the remote host is destroyed, the remote hardware smart card may request to release the corresponding storage space. The remote hardware smart card may send the release request to the local hardware smart card. After the local hardware smart card receives this release request, the corresponding namespace may be deleted by means of the namespace manager. The corresponding storage space occupied by the same will be automatically reclaimed by the local NVMe SSD, and the local namespace will continue to manage the released storage space. A release result is returned to the corresponding remote hardware smart card, so that the remote hardware smart card destroys the created Remote NS, and then the corresponding simulated storage device is destroyed by means of the remote hardware smart card, that is, the corresponding simulated storage device is deleted.

Sending a release request by the local hardware smart card is also similar, which will not be repeated.

It should be explained that the hardware components of the hardware smart card may also include a central processing unit CPU and a memory. As shown in FIG. 2, central processing unit CPU 2046 and memory 2049 are responsible for providing computing resources for upper-layer logical components of the card.

Accordingly, the embodiments of the present application may achieve a globally unified namespace resource pool and make full use of excess NVMe SSD resources, greatly improving the utilization of storage resources and avoiding the problem of local space waste. Meanwhile, based on the local NVMe SSD device, the hardware smart cards are utilized to build a globally unified namespace resource pool, shielding underlying complex distributed space management capabilities for upper-layer applications, and the acceleration capabilities of the hardware smart cards are utilized to provide remote disk access capabilities that are close to local disk performance, maintaining a consistent performance experience for upper-layer applications.

Figure 3:
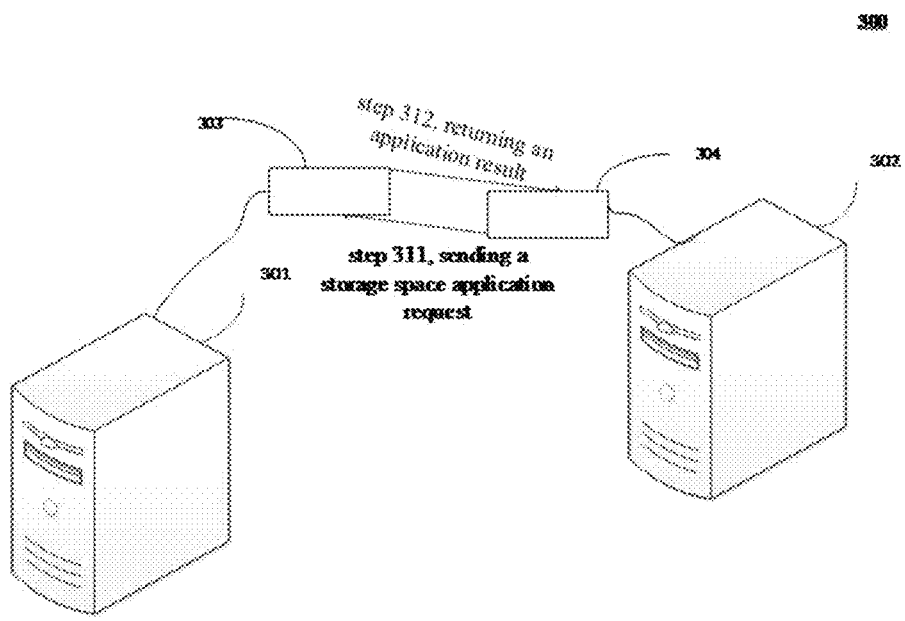
FIG. 3 is a structural diagram of distributed storage space management in an exemplary embodiment of the present application.

FIG. 3 is a structural diagram of a distributed storage space management system provided in an exemplary embodiment of the present application. As shown in FIG. 3, this system 300 may comprise: a first device 301, a second device 302, a third device 303 and a fourth device 304.

First device 301 refers to a device that may provide computing processing services in a network virtual environment, and may refer to a device that utilizes a network to perform data reading and writing and execute applications. In terms of physical implementation, first device 301 may be any device that can provide computing services, respond to service requests, and perform data reading, which may be, for example, a cloud server, a cloud host, a conventional server, or the like. Components of first device 301 mainly include a processor, a hard disk, a memory, a system bus, or the like, which is similar to a general computer architecture.

Second device 302 refers to a device that may provide computing processing services in a network virtual environment, and may refer to a device that utilizes a network to perform data reading and writing and execute applications. In terms of physical implementation, second device 302 may be any device that can provide computing services, respond to service requests, and perform data reading, which may be, for example, a cloud server, a cloud host, a conventional server, or the like. Components of second device 302 mainly include a processor, a hard disk, a memory, a system bus, or the like, which is similar to a general computer architecture.

Third device 303 is a smart hardware device, such as a hardware smart card, which may have a CPU and a memory. It is used for partitioning a deployed pre-configured storage device into storage spaces, which are provided as storage devices to virtual machines deployed on first device 301. Third device 303 is deployed on first device 301.

Fourth device 304 is a smart hardware device, such as a hardware smart card, which may have a CPU and a memory. It is used for partitioning a deployed pre-configured storage device into storage spaces, which are provided as storage devices to virtual machines deployed on second device 302. Fourth device 304 is deployed on second device 302.

There may be a plurality of second devices 302 and fourth devices 304, that is, a plurality of second devices 302 and fourth devices 304 are paired.

First device 301 and second device 302 belong to the same cluster.

Specifically, third device 303 partitions a corresponding storage space for a local virtual device from a pre-configured storage device; simulates the partitioned storage space to generate a simulated storage device corresponding to the local virtual device, for use by the local virtual device; and receives a storage space application request of fourth device 304, and according to the storage space application request, partitions a corresponding storage space for a virtual device of fourth device 304 from the pre-configured storage device, so that the partitioned storage space is simulated by means of fourth device 304 on the basis of the storage space partitioned by third device 303 to generate a simulated storage device corresponding to the virtual device of fourth device 304 for use by the virtual device of fourth device 304.

Specifically, third device 303 and fourth device 304 are deployed with a namespace manager. Third device 303, by means of the namespace manager, partitions the corresponding storage space for the local virtual device from the pre-configured storage device; and partitions, by means of the namespace manager, the corresponding storage space for the virtual device of fourth device 304 from the pre-configured storage device.

Specifically, third device 303 and fourth device 304 comprise a network protocol chip. Third device 303 receives read and write data sent by a network protocol chip of the remote hardware smart card, wherein the read and write data is encapsulated based on a network protocol corresponding to the network protocol chip; and by means of the network protocol chip of third device 303, acquiring read and write data from the encapsulated read and write data, so that the local hardware smart card performs data reading and writing in the corresponding storage space based on the read and write data.

In addition, the pre-configured storage device is a storage device that meets a pre-configured interface protocol, a network protocol corresponding to the network protocol chip corresponds to the pre-configured interface protocol, and the read and write data is encapsulated based on the network protocol and the pre-configured interface protocol. Third device 303 receives read and write data that is sent by the network protocol chip of fourth device 304 and is encapsulated based on the pre-configured interface protocol and the network protocol; and by means of the network protocol chip of third device 303, acquires, from the encapsulated read and write data, read and write data encapsulated based on the pre-configured interface protocol, to perform data reading and writing in the storage space corresponding to the pre-configured storage device according to the read and write data encapsulated based on the pre-configured interface protocol.

Specifically, third device 303 and fourth device 304 comprises a bus switch; by means of the bus switch, at least one pre-configured storage device is deployed to third device 303; and third device 303, by means of the bus switch, delivers the encapsulated read and write data to the pre-configured storage device, so as to achieve data reading and writing in the corresponding storage space.

Specifically, third device 303 simulates the partitioned storage space to generate a simulated storage device that meets the pre-configured interface protocol, and provides the corresponding simulated storage device to the local virtual device by means of a bus of first device 301.

In addition, third device 303 receives, according to a direct memory access mode, read and write data sent through a corresponding driver by the local virtual device, the driver meeting the pre-configured interface protocol and encapsulating the corresponding read and write data by means of the pre-configured interface protocol to send the read and write data; and by means of a bus switch, delivers the read and write data encapsulated according to the pre-configured interface protocol to the pre-configured storage device, so as to achieve data reading and writing in the corresponding storage space.

Specifically, the namespace manager comprises a local namespace for recording a usage state of the pre-configured storage device corresponding to third device 303, and a remote namespace for recording a usage state of the pre-configured storage device corresponding to fourth device 304; and when a storage space in the pre-configured storage device corresponding to third device 303 is less than a threshold, third device 303 determines, by means of the remote namespace, a fourth device 304 that can meet a current storage space demand, and sends a storage space application request to a corresponding fourth device 304, to partition a corresponding storage space for the local virtual device from the pre-configured storage device corresponding to fourth device 304.

Specifically, third device 303 and fourth device 304 are deployed with a coherence manager; and third device 303 locks, by means of the coherence manager, the corresponding storage space for the local virtual device according to the storage space application request, so that other fourth devices 304 or third device 303 cannot occupy the corresponding storage space.

Specifically, third device 303 and fourth device 304 deploy a cluster manager for managing third device 303 and fourth device 304 in the corresponding cluster. Third device 303 acquires, by means of the cluster manager, a health state of fourth device 304 in the corresponding cluster, wherein the health state refers to whether a running state of fourth device 304 is normal; when acquires, by means of the cluster manager, a fourth device 304 with a health state being abnormal in the corresponding cluster, removes the abnormal fourth device 304; acquires and records, by means of the cluster manager, a newly added fourth device 304 in the corresponding cluster and a corresponding health state; and acquires, by means of the cluster manager, a usage state of the pre-configured storage device corresponding to fourth device 304, so that a remote namespace records the same.

In addition, third device 303 receives a storage space release request of fourth device 304, and according to the storage space release request, releases the corresponding storage space partitioned for the virtual device of fourth device 304 from the pre-configured storage device, so that the corresponding simulated storage device is destroyed by means of fourth device 304.

Please refer to the above description for the content not detailed, which will not be repeated.

In a scenario where a hardware smart card partitions a storage space for a virtual machine deployed on a local host to achieve data reading, third device 303 in the cluster, such as a local hardware smart card, is deployed onto first device 301, such as a local host. There is also a fourth device 304 in the cluster, such as a remote hardware smart card, deployed onto second device 302, such as a remote host. After the local hardware smart card is started, a corresponding storage space, such as one namespace, may be partitioned from a local NVMe SSD by means of the namespace manager for a virtual machine on the local host. By means of the local hardware smart card, a simulated storage device that meets the NVMe protocol is generated from the partitioned storage space, and a corresponding simulated storage device is provided to the local virtual machine by means of a PCIe bus of the local host.

An Application APP deployed inside the local virtual machine delivers read and write IO by means of an NVMe driver, the read and write IO carrying read and write data. The NVMe driver encapsulates the read and write data into a DMA request that meets the NVMe protocol, and accesses a bar register space of the PCIe device of the NVMe SSD, to enable to notify the local simulated NVMe SSD to perform data migration upon the DMA request, that is, to notify the local hardware smart card to perform data migration. Accordingly, the local hardware smart card acquires the read and write data of the NVMe protocol. Then it is delivered to the local NVMe SSD corresponding to the local simulated SSD through the PCIe switch, namely the PCIe bus switch. For example, it is written to a flash storage medium of the SSD, the write IO request is completed.

In the remote host, its local hardware smart card, namely the remote hardware smart card, creates a corresponding NVMe SSD for a virtual machine deployed on the remote host. According to the way described above, its namespace manager may find a space shortage of the local NVMe SSD from information recorded in the local namespace. Then, available storage space of other remote hardware smart cards is searched in the remote NS, and if it is found that the local hardware smart card of the local host has excess storage space, a space application request may be initiated to the local hardware smart card of the local host, that is, step 311 is executed: sending a storage space application request. When the local hardware smart card of the local host receives this request, it then may partition a corresponding namespace, such as storage space n, from its local SSD according to the storage space requested in this request, that is, a Local NS storage space to which the corresponding namespace belongs is converted into a Remote NS storage space. Then, a partition result may be returned to the namespace manager of the remote hardware smart card of the remote host, which is, for example, the number of namespaces as partitioned, and information of a corresponding namespace, such as ID or other information, that is, step 312 is executed: returning an application result. Accordingly, the namespace manager may create a corresponding Remote NS space based on this partition result, record this space information, and simulate the same into an NVMe SSD through the remote hardware smart card to directly pass-through to the remote virtual machine for use.

The application in the remote virtual machine delivers the read and write data carried in the read and write IO to the NVMe driver deployed on its remote host. Moreover, according to the way described above, the NVMe driver implements DMA transmission of IO read and write data to the remote hardware smart card by means of the PCIe device, and the remote hardware smart card, by means of its NVMe Over Fabric chip, encapsulates the NVMe protocol containing the read and write data into an NVMe Over Fabric network protocol, and sends the same to the local hardware smart card of the local host. The local hardware smart card of the local host parses the NVMe Over Fabric network protocol by means of its NVMe Over Fabric chip, to acquire the NVMe protocol, which comprises the read and write data, and delivers the same to the local NVMe SSD corresponding to the local simulated SSD by means of the PCIe bus switch. For example, the data is written to the flash storage medium of this SSD, the write IO request is completed.

For the content not recorded in detail here, reference may be made to the content described above, which will not be repeated.

In the above embodiment, third device 303 and fourth device 304 are in network connection. If third device 303 and fourth device 304 are in communication connection, a network standard of this mobile network may be any one of 2G (GSM), 2.5 G (GPRS), 3G (WCDMA, TD-SCDMA, CDMA2000, UTMS), 4G (LTE), 4G+ (LTE+), WiMax, and 5G, etc.

Figure 4:
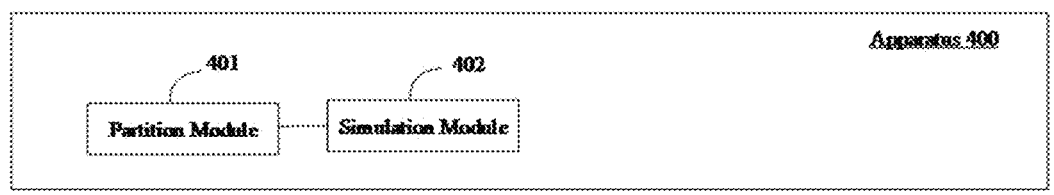
FIG. 4 is a structural diagram of a distributed storage space management apparatus provided in an exemplary embodiment of the present application.

FIG. 4 is a schematic diagram of a structural framework of a distributed storage space management apparatus provided in an exemplary embodiment of the present application. This apparatus 400 may be applied to a computing device, such as a hardware smart card. This apparatus 400 comprises: a partition module 401 and a simulation module 402; and functions of the modules will be expounded in detail below.

Partition module 401 is used for partitioning a corresponding storage space for a local virtual device from a pre-configured storage device.

Simulation module 402 is used for simulating the partitioned storage space to generate a simulated storage device corresponding to the local virtual device, for use by the local virtual device.

Partition module 401 is used for receiving a storage space application request of a remote hardware smart card, and partitioning, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

Specifically, the hardware smart card is deployed with a namespace manager. The namespace manager is used for partitioning a corresponding storage space for the local virtual device from the pre-configured storage device; and the namespace manager is used for partitioning a corresponding storage space for the remote virtual device from the pre-configured storage device.

Specifically, the hardware smart card comprises a network protocol chip, and this apparatus 400 further comprises: a receiving module, for receiving read and write data sent by the network protocol chip of the remote hardware smart card, wherein the read and write data are encapsulated based on a network protocol corresponding to the network protocol chip; and the network protocol chip of the local hardware smart card, for acquiring the read and write data from the encapsulated read data, so that the local hardware smart card performs data reading and writing in the corresponding storage space based on the read and write data.

Specifically, the pre-configured storage device is a storage device that meets a pre-configured interface protocol, the network protocol corresponding to the network protocol chip corresponds to the pre-configured interface protocol, and the read and write data are encapsulated based on the network protocol and the pre-configured interface protocol. The receiving module is used for receiving the read and write data that is sent by the network protocol chip of the remote hardware smart card and is encapsulated based on the pre-configured interface protocol and the network protocol; and the network protocol chip of the local hardware smart card is used for acquiring, from the encapsulated read and write data, read and write data encapsulated based on the pre-configured interface protocol, to perform data reading and writing in the storage space corresponding to the pre-configured storage device according to the read and write data encapsulated based on the pre-configured interface protocol.

Specifically, the hardware smart card comprises a bus switch; by means of the bus switch, at least one pre-configured storage device is deployed to the local hardware smart card; and the bus switch is used for delivering the encapsulated read and write data to the pre-configured storage device to achieve data reading and writing in the corresponding storage space.

Specifically, simulation module 402 is used for simulating the partitioned storage space to generate a simulated storage device that meets the pre-configured interface protocol, and providing the corresponding simulated storage device to the local virtual device by means of a bus of the local host.

In addition, the receiving module is used for receiving, according to a direct memory access mode, read and write data sent through a corresponding driver by the local virtual device, the driver meeting the pre-configured interface protocol and encapsulating the corresponding read and write data by means of the pre-configured interface protocol to send the read and write data; and the bus switch is used for delivering the read and write data encapsulated according to the pre-configured interface protocol to the pre-configured storage device, to achieve data reading and writing in the corresponding storage space.

Specifically, the namespace manager comprises a local namespace for recording a usage state of the pre-configured storage device corresponding to the local hardware smart card, and a remote namespace for recording a usage state of the pre-configured storage device corresponding to the remote hardware smart card; when a storage space in the pre-configured storage device corresponding to the local hardware smart card is less than a threshold, the remote namespace is used for determining a remote hardware smart card that can meet a current storage space demand, and sending a storage space application request to a corresponding remote hardware smart card, to partition a corresponding storage space for the local virtual device from a pre-configured storage device corresponding to the remote hardware smart card.

Specifically, the hardware smart card is deployed with a coherence manager; the coherence manager is used for locking the corresponding storage space for the local virtual device according to the storage space application request, so that other hardware smart cards cannot occupy the corresponding storage space.

Specifically, the hardware smart cards deploy a cluster manager for managing hardware smart cards in a corresponding cluster; the cluster manager is used for acquiring health states of remote hardware smart cards in the corresponding cluster, wherein the health state refers to whether a running state of the remote hardware smart card is normal; the cluster manager is used for, when acquiring a remote hardware smart card with the health state being abnormal in the corresponding cluster, removing the abnormal remote hardware smart card; the cluster manager is user for acquiring and recording a newly added remote hardware smart card in the corresponding cluster and a corresponding health state; and the cluster manager is user for acquiring usage states of pre-configured storage devices corresponding to the remote hardware smart cards, so that remote namespaces records the usage states.

In addition, the receiving module is used for receiving a storage space release request of the remote hardware smart card, and releasing, according to the storage space release request, the corresponding storage space partitioned for the remote virtual device from the pre-configured storage device, so that the corresponding simulated storage device is destroyed by means of the remote hardware smart card.

Please refer to the above description for the content not detailed for the apparatus 400, which will not be repeated.

Figure 5:
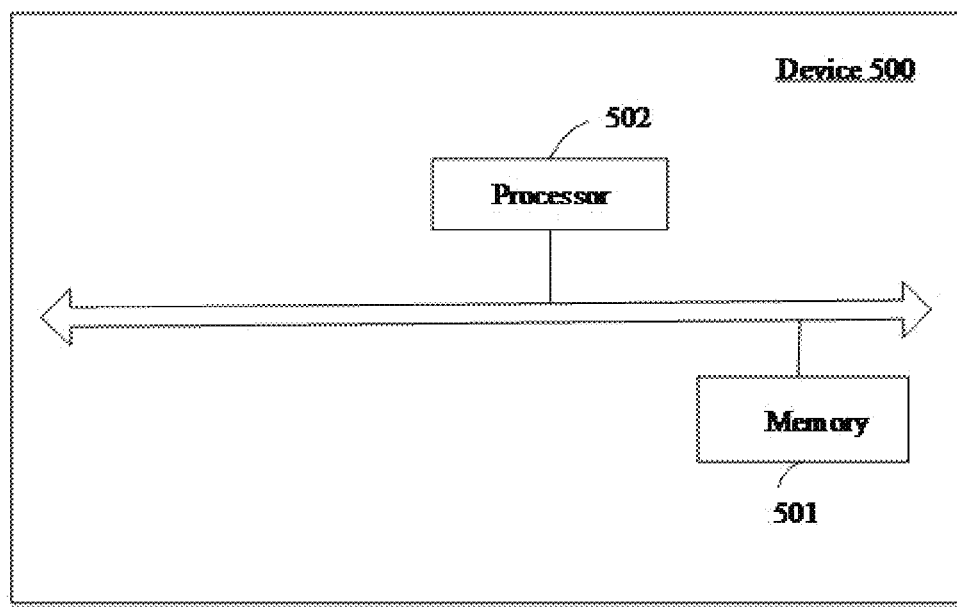
FIG. 5 is a structural diagram of a computing device provided in an exemplary embodiment of the present application.

The internal functions and structure of the apparatus 400 shown in FIG. 4 are described above. In a possible design, the structure of the apparatus 400 shown in FIG. 4 may be implemented as a computing device, such as a hardware smart card. As shown in FIG. 5, this device 500 may comprise: a memory 501 and a processor 502;

Memory 501 is used for storing a computer program.

Processor 502 is used for executing the computer program to: partition a corresponding storage space for a local virtual device from a pre-configured storage device; simulate the partitioned storage space to generate a simulated storage device corresponding to the local virtual device, for use by the local virtual device; and receive a storage space application request of a remote hardware smart card, and according to the storage space application request, partition a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

Specifically, processor 502 is specifically used for partitioning a corresponding storage space for the local virtual device from the pre-configured storage device; and partitioning a corresponding storage space for the remote virtual device from the pre-configured storage device.

Specifically, this device 500 comprises a network protocol chip, and processor 502 is further used for receiving read and write data sent by a network protocol chip of the remote hardware smart card, wherein the read and write data are encapsulated based on a network protocol corresponding to the network protocol chip; and the network protocol chip is used for acquiring read and write data from the encapsulated read and write data, so that this device 500 performs data reading and writing in the corresponding storage space based on the read and write data.

Specifically, the pre-configured storage device is a storage device that meets a pre-configured interface protocol, the network protocol corresponding to the network protocol chip corresponds to the pre-configured interface protocol, and the read and write data are encapsulated based on the network protocol and the pre-configured interface protocol; and processor 502 is further used for receiving the read and write data that is sent by the network protocol chip of the remote hardware smart card and is encapsulated based on the pre-configured interface protocol and the network protocol; and the network protocol chip is used for acquiring, from the encapsulated read data, read and write data encapsulated based on the pre-configured interface protocol, to perform data reading and writing in the storage space corresponding to the pre-configured storage device according to the read and write data encapsulated based on the pre-configured interface protocol.

Specifically, this device 500 comprises a bus switch; by means of the bus switch, at least one pre-configured storage device is deployed to the local hardware smart card; and the bus switch is used for delivering the encapsulated read and write data to the pre-configured storage device to achieve data reading and writing in the corresponding storage space.

Specifically, processor 502 is specifically used for simulating the partitioned storage space to generate a simulated storage device that meets the pre-configured interface protocol, and providing the corresponding simulated storage device to the local virtual device by means of a bus of the local host.

In addition, processor 502 is further used for receiving, according to a direct memory access mode, read and write data sent through a corresponding driver by the local virtual device, the driver meeting the pre-configured interface protocol and encapsulating the corresponding read and write data by means of the pre-configured interface protocol to send the read and write data; and the bus switch is used for delivering the read and write data encapsulated according to the pre-configured interface protocol to the pre-configured storage device, to achieve data reading and writing in the corresponding storage space.

Specifically, processor 502 is specifically used for, when a storage space in the pre-configured storage device corresponding to this device 500 is less than a threshold, determining a remote hardware smart card that can meet a current storage space demand, and sending a storage space application request to a corresponding remote hardware smart card, to partition a corresponding storage space for the local virtual device from the pre-configured storage device corresponding to the remote hardware smart card.

Specifically, processor 502 is specifically used for locking the corresponding storage space for the local virtual device according to the storage space application request, so that other hardware smart cards cannot occupy the corresponding storage space.

Specifically, processor 502 is specifically used for: acquiring health states of remote hardware smart cards in the corresponding cluster, wherein the health state refers to whether a running state of the remote hardware smart card is normal; when acquiring a remote hardware smart card with the health state being abnormal in the corresponding cluster, removing the abnormal remote hardware smart card; acquiring and recording a newly added remote hardware smart card in the corresponding cluster and a corresponding health state; acquiring usage states of the pre-configured storage devices corresponding to the remote hardware smart cards, so that remote namespaces records the usage states.

In addition, processor 502 is further used for receiving a storage space release request of the remote hardware smart card, and releasing, according to the storage space release request, the corresponding storage space partitioned for the remote virtual device from the pre-configured storage device, so that the corresponding simulated storage device is destroyed by means of the remote hardware smart card.

Please refer to the above description for the content not detailed for the device 500, which will not be repeated.

An embodiment of the present invention provides a computer storage medium. A computer program, when executed by one or more processors, causes the one or more processors to implement the steps of a distributed storage space management method in the method embodiments of FIGS. 1-2. This will not be repeated.

An embodiment of the present invention provides a computer program product, comprising a computer program or instructions, wherein the computer program, when executed by a processor, causes the processor to implement the steps of a distributed storage space management method in the method embodiments of FIGS. 1-2.

In addition, some processes described in the above embodiments and drawings include a plurality of operations that appear in a particular order, but it should be clearly understood that these operations may not be executed in the order as shown herein, or may be executed in parallel. Serial numbers of operations, such as 101, 102, 103, etc., are only used to distinguish different operations, and the serial numbers per se do not represent any execution order. Additionally, these processes may comprise more or fewer operations, and the operations may be executed in order or in parallel. It should be explained that descriptions herein, such as "first" and "second", are used to distinguish different messages, devices, modules, etc., and neither represent an order, nor limit the "first" and "second" to be of different types.

The apparatus embodiments described above are only illustrative, where units described as separate parts may or may not be physically separated, and the parts shown as units may or may not be physical units, that is, they may be located in one location, or may be distributed across a plurality of network units. Some or all of the modules therein may be selected according to actual needs to achieve the purpose of the solution of the embodiments. Those of ordinary skill in the art may understand and implement the same without any creative labor.

From the above description of the embodiments, those skilled in the art may clearly understand that each implementation may be achieved by means of a necessary general hardware platform, or of course, may also be achieved by combining hardware and software. Based on such understanding, the essence of the above technical solution or the part that makes a contribution over the prior art may be embodied in the form of a computer product. The present invention may employ a form of a computer program product implemented on one or more computer-usable storage media containing computer-usable program codes (including but not limited to disk storage, CD-ROM, optical storage, or the like).

The present invention is described with reference to the flow charts and/or block diagrams of the methods, devices (systems), and computer program products according to the embodiments of the present invention. It should be understood that each flow and/or block in the flow charts and/or block diagrams, as well as combinations of flows and/or blocks in the flow charts and/or block diagrams, may be implemented by computer program instructions. These computer program instructions may be provided to a processor of a general-purpose computer, a specialized computer, an embedded processor, or other programmable multimedia data processing device to produce one machine, such that the instructions executed by the processor of the computer or other programmable multimedia data processing device produce an apparatus for implementing functions designated in one or more flows in a flow chart and/or one or more blocks in a block diagram.

These computer program instructions may also be stored in a computer-readable memory that can guide a computer or other programmable multimedia data processing devices to work in a particular way, such that instructions stored in this computer-readable memory produce an article of manufacture including an instruction apparatus that implements functions designated in one or more flows in a flow chart and/or one or more blocks in a block diagram.

These computer program instructions may also be loaded onto a computer or other programmable multimedia data processing devices, such that a series of operating steps are executed on the computer or other programmable devices to generate computer-implemented processing, thereby enabling the instructions executed on the computer or other programmable devices to provide steps for implementing functions designated in one or more flows in a flow chart and/or one or more blocks in a block diagram.

In a typical configuration, the computing device comprises one or more processors (CPUs), input/output interface, network interface, and memory.

The memory may include a non-permanent storage such as a random access memory (RAM), and/or non-volatile memory forms such as a read-only memory (ROM) or a flash RAM, in computer-readable media. The memory is an example of the computer-readable media.

The computer-readable media include both permanent and non-permanent, removable and non-removable media that may implement information storage by any method or technology. The information may be computer-readable instructions, data structures, modules of programs, or other data. Examples of computer storage media include, but are not limited to, a phase-change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a tape magnetic disk storage or other magnetic storage devices, or any other non-transmission media, which may be used to store information that may be accessed by a computing device. As defined herein, the computer-readable media do not include transitory media, such as modulated data signals and carrier waves.

Finally, it should be noted that the above embodiments are only used to explain, instead of limiting, the technical solutions of the present invention. Although the present invention has been described in detail with reference to the above embodiments, those of ordinary skill in the art should understand that they can still make modifications to the technical solutions recorded in the above embodiments, or perform equivalent replacements for some of technical features thereof. Moreover, these modifications or replacements do not cause the essence of the corresponding technical solutions to deviate from the spirit and scope of the technical solutions of the various embodiments of the present invention.

What is claimed is:

1. A distributed storage space management method, applied to a hardware smart card, wherein the hardware smart card is deployed on a local host as a local hardware smart card, and the local host is deployed with a local virtual device, the method comprises:
 partitioning a corresponding storage space for the local virtual device from a pre- configured storage device;
 simulating the partitioned storage space to generate a simulated storage device corresponding to the local virtual device, for use by the local virtual device; and
 receiving a storage space application request of a remote hardware smart card, and partitioning, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

2. The method according to claim 1, wherein the hardware smart card is deployed with a namespace manager, and the method further comprises:
the partitioning the corresponding storage space for the local virtual device from the pre-configured storage device comprises: partitioning, by means of the namespace manager, the corresponding storage space for the local virtual device from the pre-configured storage device; and
the partitioning the corresponding storage space for the remote virtual device from the pre- configured storage device comprises: partitioning, by means of the namespace manager, the corresponding storage space for the remote virtual device from the pre-configured storage device.

3. The method according to claim 1, wherein the hardware smart card comprises a network protocol chip, and the method further comprises:
receiving, by means of the local hardware smart card, read and write data sent by the network protocol chip of the remote hardware smart card, wherein the read and write data is encapsulated based on a network protocol corresponding to the network protocol chip; and
acquiring, by means of the network protocol chip of the local hardware smart card, read and write data from the encapsulated read and write data, so that the local hardware smart card performs data reading and writing in a corresponding storage space based on the read and write data.

4. The method according to claim 3, wherein the pre-configured storage device is a storage device that meets a pre-configured interface protocol, the network protocol corresponding to the network protocol chip corresponds to the pre-configured interface protocol, and the read and write data are encapsulated based on the network protocol and the pre-configured interface protocol; and the method further comprises:
receiving, by means of the local hardware smart card, the read and write data that is sent by the network protocol chip of the remote hardware smart card and is encapsulated based on the pre-configured interface protocol and the network protocol; and
by means of the network protocol chip of the local hardware smart card, acquiring, from the encapsulated read and write data, read and write data encapsulated based on the pre-configured interface protocol, to perform data reading and writing in a storage space corresponding to the pre-configured storage device according to the read and write data encapsulated based on the pre-configured interface protocol.

5. The method according to claim 4, wherein the hardware smart card comprises a bus switch; by means of the bus switch, at least one pre-configured storage device is deployed to the local hardware smart card; and
the method further comprises: delivering, by means of the bus switch, the encapsulated read and write data to the pre-configured storage device, to achieve data reading and writing in the corresponding storage space.

6. The method according to claim 1, wherein the simulating the partitioned storage space to generate the simulated storage device corresponding to the local virtual device comprises:
simulating, by means of the local hardware smart card, the partitioned storage space to generate a simulated storage device meeting a pre-configured interface protocol, and providing the corresponding simulated storage device to the local virtual device by means of a bus of the local host.

7. The method according to claim 1, further comprising:
receiving, according to a direct memory access mode, read and write data sent through a corresponding driver by the local virtual device, the driver meeting a pre-configured interface protocol and encapsulating the corresponding read and write data by means of the pre-configured interface protocol to send the read and write data; and
delivering, by means of a bus switch, the read and write data encapsulated according to the pre-configured interface protocol to the pre-configured storage device, to achieve data reading and writing in a corresponding storage space.

8. The method according to claim 2, wherein the namespace manager comprises a local namespace for recording a usage state of a pre-configured storage device corresponding to the local hardware smart card, and a remote namespace for recording a usage state of a pre-configured storage device corresponding to the remote hardware smart card; and
the method further comprises:
when a storage space in the pre-configured storage device corresponding to the local hardware smart card is less than a threshold, determining, by means of the remote namespace, a remote hardware smart card that is able to meet a current storage space demand, and sending a storage space application request to a corresponding remote hardware smart card, to partition a corresponding storage space for the local virtual device from the pre-configured storage device corresponding to the remote hardware smart card.

9. The method according to claim 8, wherein the hardware smart card is deployed with a coherence manager; and the method further comprises: locking, by means of the coherence manager, the corresponding storage space for the local virtual device according to the storage space application request, so that other hardware smart cards cannot occupy the corresponding storage space.

10. The method according to claim 1, wherein the hardware smart card deploys a cluster manager for managing hardware smart cards in a corresponding cluster; and
the method further comprises: acquiring, by means of the cluster manager, health states of remote hardware smart cards in the corresponding cluster, wherein the health state refers to whether a running state of the remote hardware smart card is normal;
when acquiring, by means of the cluster manager, a remote hardware smart card with the health state being abnormal in the corresponding cluster, removing the abnormal remote hardware smart card;
acquiring and recording, by means of the cluster manager, a newly added remote hardware smart card in the corresponding cluster and a corresponding health state; and
acquiring, by means of the cluster manager, usage states of pre-configured storage devices corresponding to the remote hardware smart cards, so that remote namespaces record the usage states.

11. The method according to claim 1, further comprising:
receiving a storage space release request of the remote hardware smart card, and releasing, according to the storage space release request, the corresponding storage space partitioned for the remote virtual device from the pre-configured storage device, so that the corresponding simulated storage device is destroyed by means of the remote hardware smart card.

12. A computing device, comprising: a memory and a processor, wherein:
the memory is used for storing a computer program; and
the processor executes the computer program to:
partition a corresponding storage space for a local virtual device from a pre-configured storage device;
simulate the partitioned storage space to generate a simulated storage device corresponding to the local virtual device, for use by the local virtual device; and
receive a storage space application request of a remote hardware smart card, and partition, according to the storage space application request, a corresponding storage space for a remote virtual device from the pre-configured storage device, so that the partitioned storage space is simulated by means of the remote hardware smart card on the basis of the storage space partitioned by the local hardware smart card to generate a simulated storage device corresponding to the remote virtual device, for use by the remote virtual device.

13. A non-transitory computer-readable storage medium storing a computer program that, when executed by one or more processors, causes the one or more processors to implement steps in the method of claim 1.

14. The computing device according to claim 12, wherein the hardware smart card is deployed with a namespace manager, and
wherein the processor executes the computer program to:
partition, by means of the namespace manager, the corresponding storage space for the local virtual device from the pre-configured storage device; and
partition, by means of the namespace manager, the corresponding storage space for the remote virtual device from the pre-configured storage device.

15. The computing device according to claim 12, wherein the hardware smart card comprises a network protocol chip, and
wherein the processor executes the computer program to:
receive, by means of the local hardware smart card, read and write data sent by the network protocol chip of the remote hardware smart card, wherein the read and write data is encapsulated based on a network protocol corresponding to the network protocol chip; and
acquire, by means of the network protocol chip of the local hardware smart card, read and write data from the encapsulated read and write data, so that the local hardware smart card performs data reading and writing in a corresponding storage space based on the read and write data.

16. The computing device according to claim 15, wherein the pre-configured storage device is a storage device that meets a pre-configured interface protocol, the network protocol corresponding to the network protocol chip corresponds to the pre-configured interface protocol, and the read and write data are encapsulated based on the network protocol and the pre-configured interface protocol, and
wherein the processor executes the computer program to:
receive, by means of the local hardware smart card, the read and write data that is sent by the network protocol chip of the remote hardware smart card and is encapsulated based on the pre-configured interface protocol and the network protocol; and
by means of the network protocol chip of the local hardware smart card, acquire, from the encapsulated read and write data, read and write data encapsulated based on the pre-configured interface protocol, to perform data reading and writing in a storage space corresponding to the pre-configured storage device according to the read and write data encapsulated based on the pre-configured interface protocol.

17. The computing device according to claim 16, wherein the hardware smart card comprises a bus switch; by means of the bus switch, at least one pre-configured storage device is deployed to the local hardware smart card, and
wherein the processor executes the computer program to:
deliver, by means of the bus switch, the encapsulated read and write data to the pre-configured storage device, to achieve data reading and writing in the corresponding storage space.

18. The computing device according to claim 12, wherein the processor executes the computer program to:
simulate, by means of the local hardware smart card, the partitioned storage space to generate a simulated storage device meeting a pre-configured interface protocol, and provide the corresponding simulated storage device to the local virtual device by means of a bus of the local host.

19. The computing device according to claim 12, wherein the processor executes the computer program to:
receive, according to a direct memory access mode, read and write data sent through a corresponding driver by the local virtual device, the driver meeting a pre-configured interface protocol and encapsulating the corresponding read and write data by means of the pre-configured interface protocol to send the read and write data; and
deliver, by means of a bus switch, the read and write data encapsulated according to the pre-configured interface protocol to the pre-configured storage device, to achieve data reading and writing in a corresponding storage space.

20. The computing device according to claim 14, wherein the namespace manager comprises a local namespace for recording a usage state of a pre-configured storage device corresponding to the local hardware smart card, and a remote namespace for recording a usage state of a pre-configured storage device corresponding to the remote hardware smart card, and
wherein the processor executes the computer program to:
when a storage space in the pre-configured storage device corresponding to the local hardware smart card is less than a threshold, determine, by means of the remote namespace, a remote hardware smart card that is able to meet a current storage space demand, and send a storage space application request to a corresponding remote hardware smart card, to partition a corresponding storage space for the local virtual device from the pre-configured storage device corresponding to the remote hardware smart card.

* * * * *